FIG. 2

April 25, 1961  A. E. BACHELET ET AL  2,981,803
PROGRAM SWITCHING SYSTEM
Filed Dec. 28, 1955  11 Sheets-Sheet 4

FIG. 4

INVENTORS
A. E. BACHELET
G. S. BIBBINS
A. J. CELENTANO
G. A. PULLIS
BY
R. O. Covell
ATTORNEY

INVENTORS
A. E. BACHELET
G. S. BIBBINS
A. J. CELENTANO
G. A. PULLIS
BY
R. O. Covell
ATTORNEY

United States Patent Office 2,981,803
Patented Apr. 25, 1961

2,981,803

PROGRAM SWITCHING SYSTEM

Albert E. Bachelet, New York, N.Y., George S. Bibbins, Short Hills, N.J., and Arnold J. Celentano, New York, and George A. Pullis, Riverdale, N.Y.; said Bachelet, said Celentano, and said Pullis, assignors to Bell Telephone Laboratories, Incorporated, New York, N.Y., a corporation of New York, and said Bibbins assignor to American Telephone and Telegraph Company, a corporation of New York Filed Dec. 28, 1955, Ser. No. 555,921

9 Claims. (Cl. 179—22)

This invention relates to communication switching systems and more particularly to systems for selective interconnection of incoming and outgoing communication channels such as are used in radio and television broadcast networks.

Such communication channels are interconnected to form networks, often extensive and complex, the configuration of which must be changed at times to meet the broadcaster's service requirements. The switching involved in effecting the changes is under control of a human operator and is in accordance with an established program schedule. In general, the requisite switching operations occur at regular times, usually coincident with the hour or quarter hour, and must be accomplished in a very short interval. Also, of course, the changes should be realized without error. Further, the switching equipment or system should be such as to introduce no electrical interference into the communication channels.

Switching systems utilized heretofore comprise a number of plugs and jacks or manually operated switches. They are relatively slow in operation, require intricate and very concentrated operation by the operator and are subject to error.

One object of this invention is to reduce the time required to effect changes in the configuration of networks of the type above indicated.

A further object of this invention is to minimize the stringency of time limitations on actions by the operator and thereby minimize switching errors due to hurried operator actions and operator fatigue.

Still another object of this invention is to enable achievement of the switching with substantially no electrical interference with the communication channels.

In accordance with one feature of this invention, preparations for interconnecting incoming and outgoing communication channels may be made prior to the time of required service and the interconnection rapidly completed either singly or in groups at the required time.

Another feature of this invention pertains to the graphic arrangement of the switching keys and indicating lights which allows interconnection preselection and immediate verification thereof as well as indication of completed connections on a coordinate basis.

A further feature of this invention involves a common circuit to reduce the inductive discharge of the crossbar switch select magnets thereby preventing electrical interference to the communication channels with a minimum of circuit components.

Still another feature of this invention involves a bus bar battery feed and fusing arrangement to provide an emergency relay holding path in the case of failure of one but not all fuses.

The invention and the above noted and other features thereof will be understood more clearly and fully from the following detailed description with reference to the accompanying drawings in which.

A broadcast switching control system illustrative of one embodiment of this invention comprises a control and display panel, crossbar switches, and control means whereby the select and hold magnets of the crossbar switches are operated to close selected crossbar switch crosspoints, a portion of the crosspoints representing preselected connections between incoming and outgoing communication lines and other crosspoints of the same switch defining electrical paths to effect execution of the preselected connections. The preselected connections may be executed singly or in salvo groups. Means are provided to prevent selection in case a plurality of incoming line keys are simultaneously operated.

Although the subject invention has been illustrated by a particular embodiment thereof, the invention is not limited to specific circuits herein disclosed. Various applications, modifications and arrangements of the invention will readily occur to those skilled in the art. For example, a portion or all of the crossbar switch electrical contact sets could be replaced by equivalent switch means, and if ten or fewer incoming lines were involved the tens steering function could be omitted.

Definitions

Herein the act of connecting an incoming communication channel to an outgoing communication channel will be referred to as a "switch" and the process of selecting interconnections between incoming and outgoing communication channels with provisions for completing the interconnection at a later time will be referred to as a "preselection." The preselection may provide for execution of a switch as an individual act or several preselections may be executed as a group. Execution of a group of preselections will be referred to as a "salvo." An incoming communication channel will be referred to as an incoming line and an outgoing communication channel will be referred to as an outgoing line.

Figure 10:
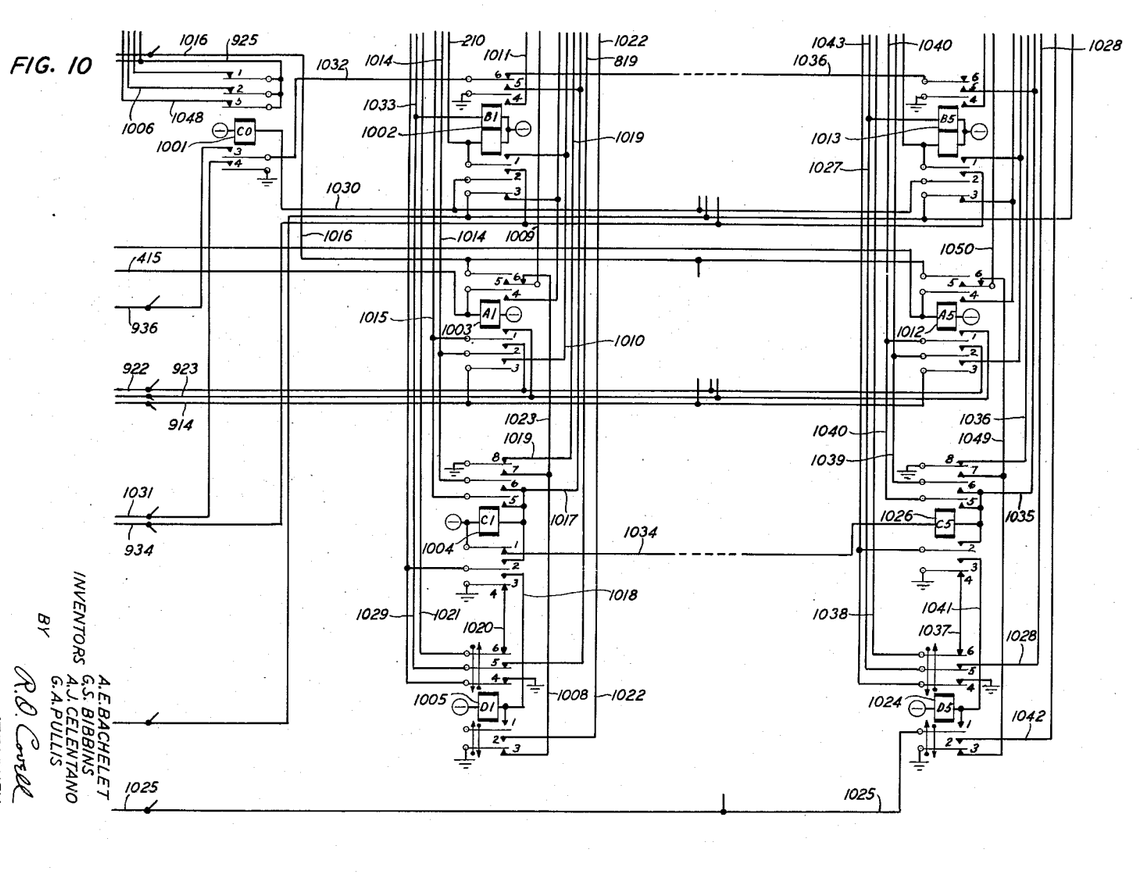

The circuit elements are designated with numerical values having a first or first and second digit in combination equal to the figure in which the labeled element first appears in the drawing. For example, all circuit elements shown on Fig. 4 have a three-digit designation such as 401 wherein the first digit indicates its location as being in Fig. 4. Where four-digit designations are employed, the first two digits designate the figure in which the element is shown. For example, relay 1005 is shown in Fig. 10.

Physical arrangement

Figure 13:
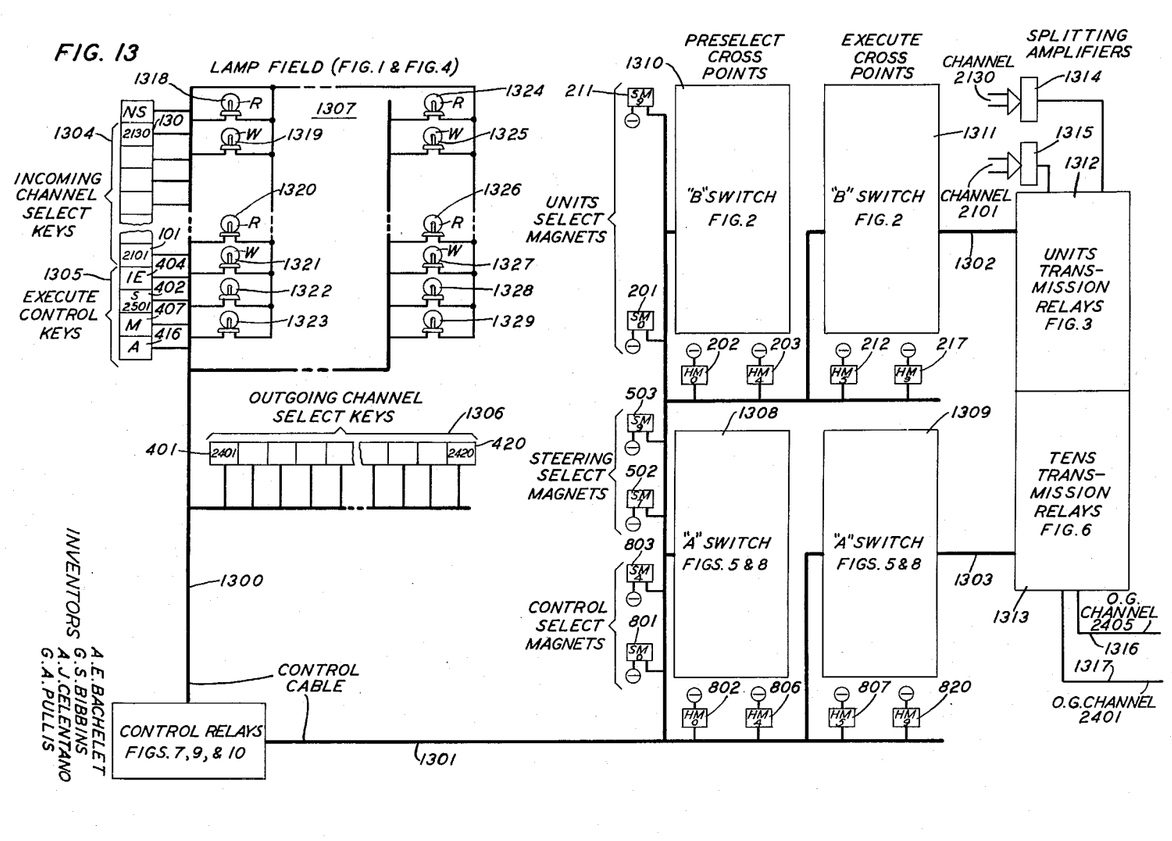
Fig. 13 is a block diagram of a program switching control system in accordance with this invention.

The detailed circuits of Figs. 1 through 10 can best be understood by reference to the system block diagram shown in Fig. 13. In Fig. 13, the major blocks or groups of circuit elements are labeled to show the figure of the drawing in which the detailed circuitry is shown and, when applicable, labels from such figures have been carried forward to the respective elements of Fig. 13.

Figure 1:
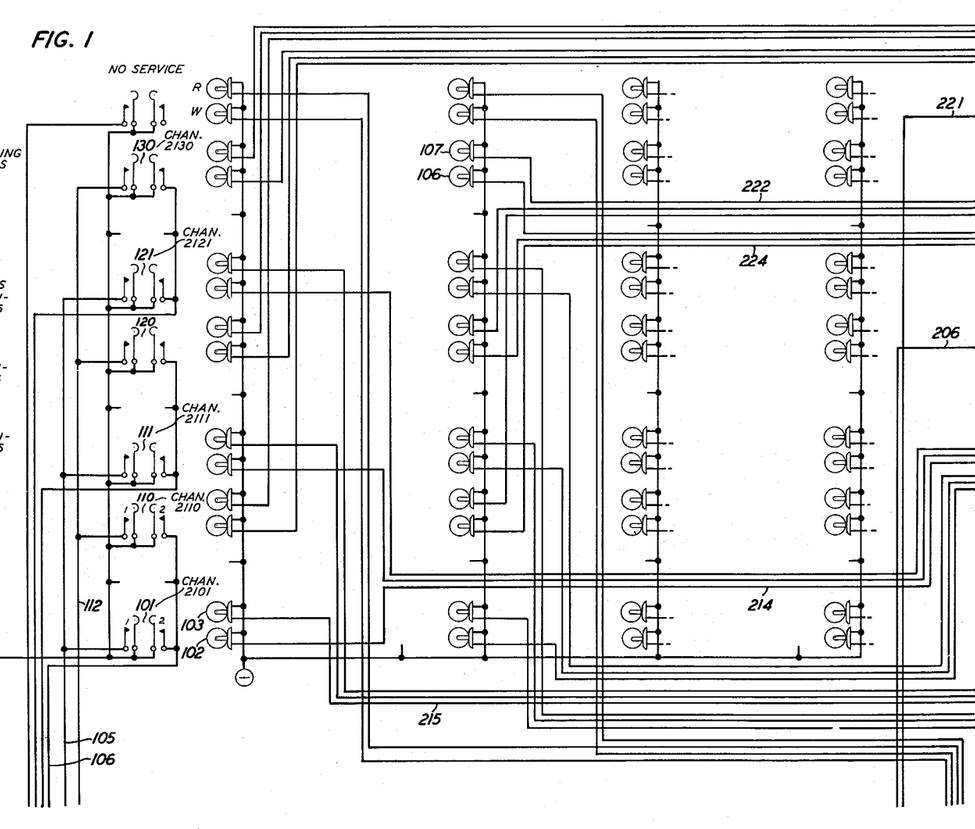
Figs. 1 through 10, arranged as shown in Fig. 12, comprise a complete circuit of a program switching control system illustrative of one embodiment of the invention.
Figure 4:
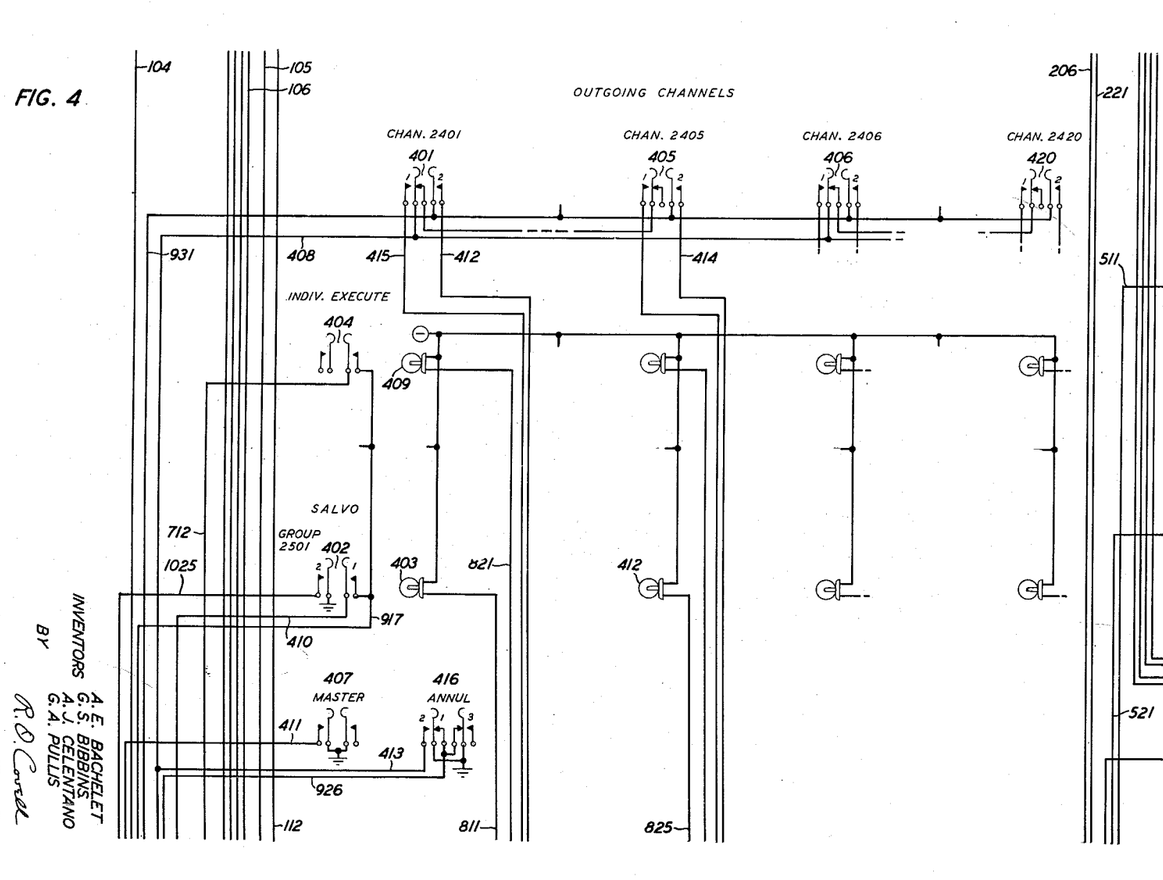

The switching functions are manually controlled from a control and display panel shown in Figs. 1 and 4 which comprises a vertical row of keys wherein there is one key for each incoming communication channel and a plurality of common control keys, a horizontal row of keys wherein there is one key for each outgoing communication channel, a coordinate display of pairs of lamps wherein one lamp of each pair when energized indicates a preselection of a connection between an incoming and an outgoing communication channel and the other lamp of each pair when energized indicates a completed connection between an incoming and outgoing communication channel, and a plurality of lamps associated with the aforementioned common control keys.

Figure 2:
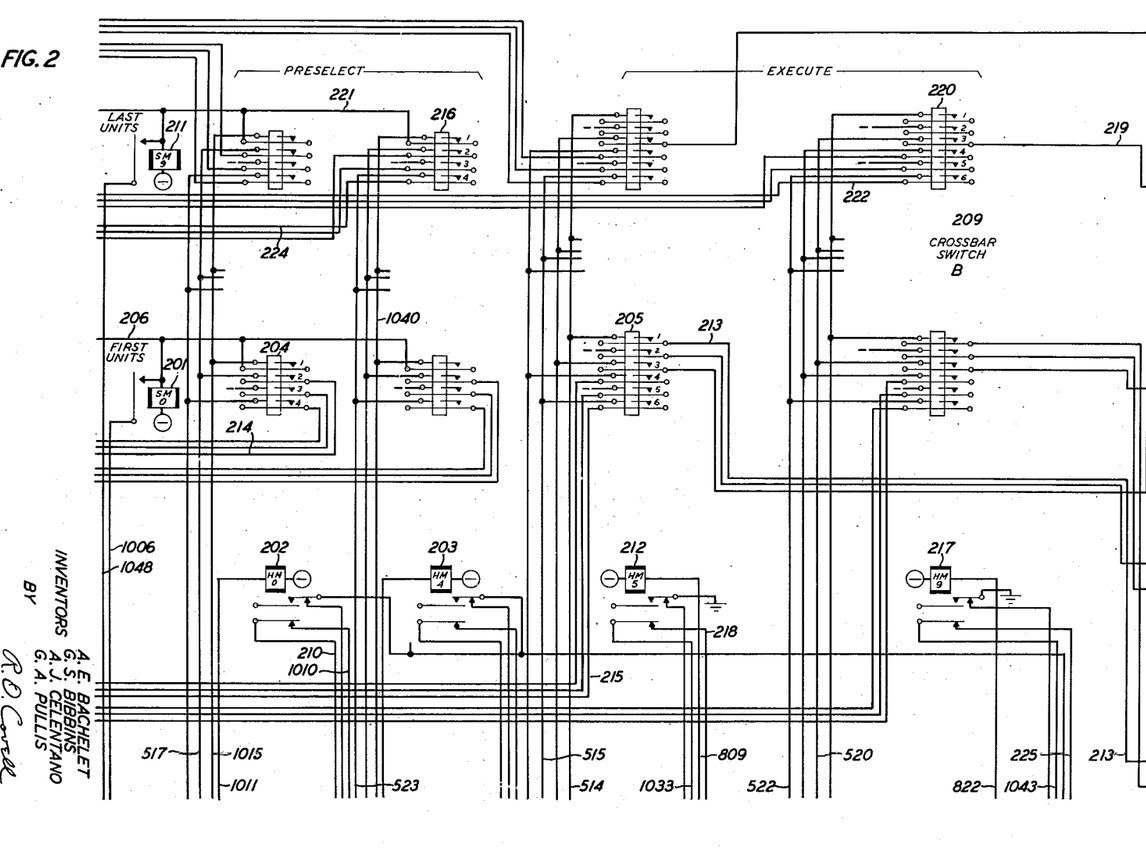
Figure 5:
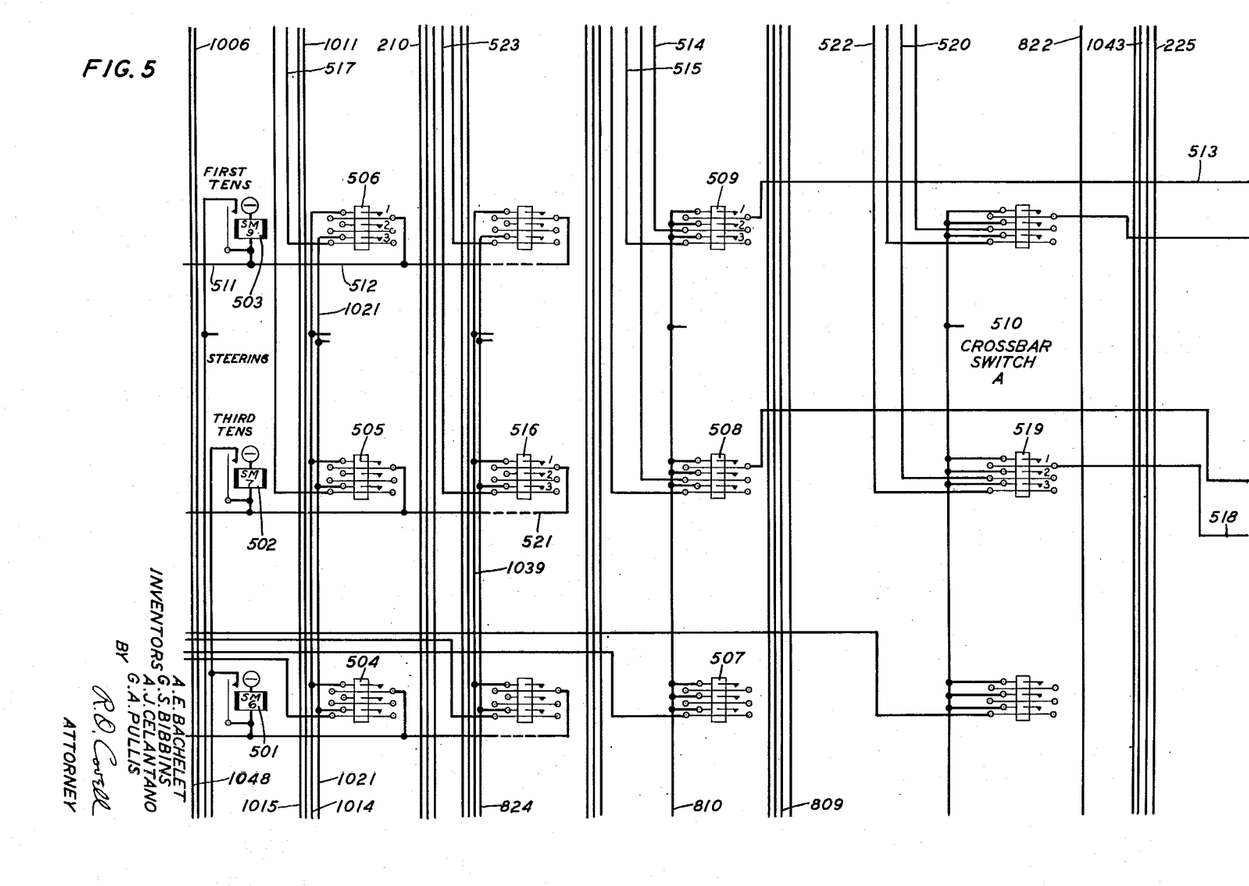
Figure 8:
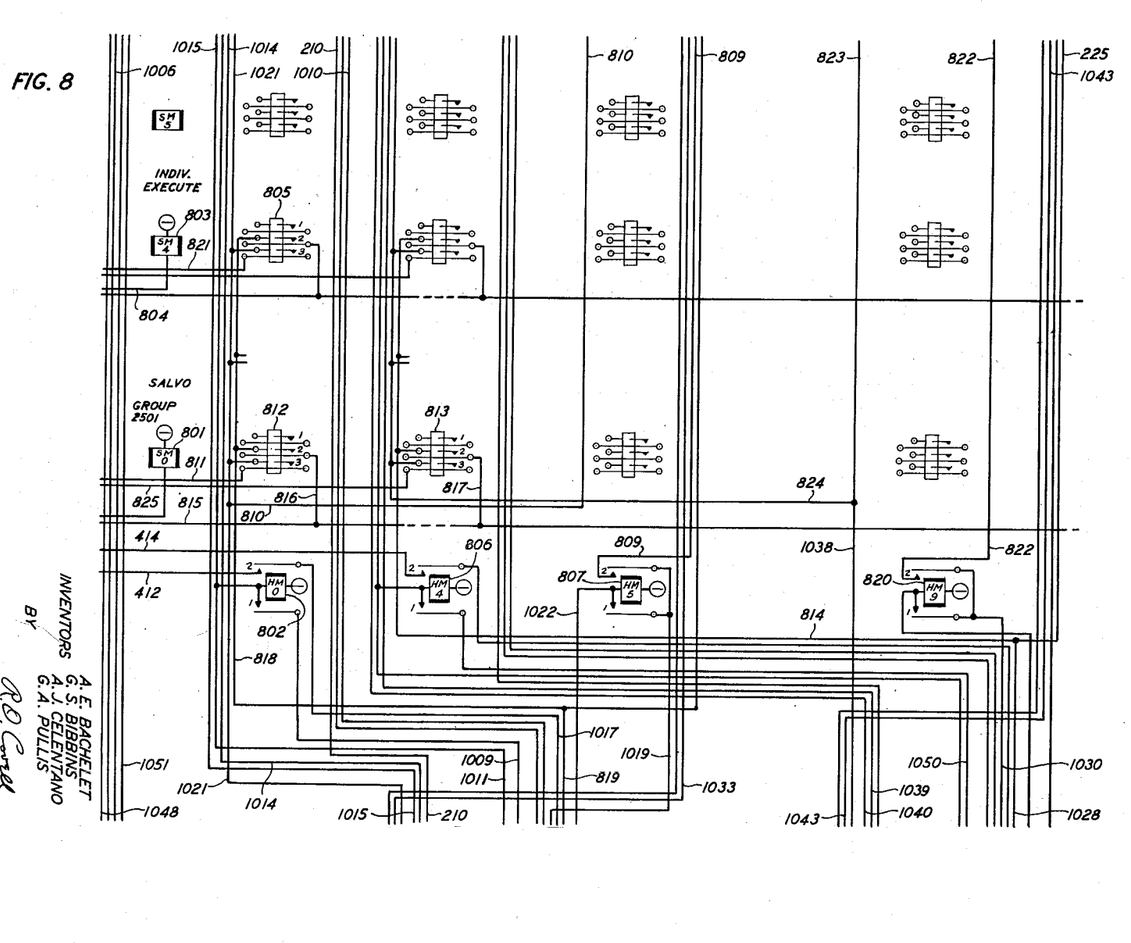

As shown in Figs. 2, 5 and 8, there are "A" and "B" crossbar switches each consisting of ten horizontal rows and ten vertical rows. The horizontal rows of the "B" switch shown in Fig. 2 are assigned to incoming communication channels and the horizontal rows of the "A" crossbar switch shown in Figs. 5 and 8 are assigned to the following mode of operation and control functions: (1) tens steering, (2) individual execution, (3) salvo execution, and (4) idle or no service.

The vertical rows of the crossbar switches are assigned in pairs to outgoing communication channels. One row of each pair is for preselection and the other row of the pair is for execution of a "switch."

The "A" and "B" crossbar switches are assigned in pairs and each pair of such switches can serve five outgoing communication channels and up to 30 incoming channels.

Figure 9:
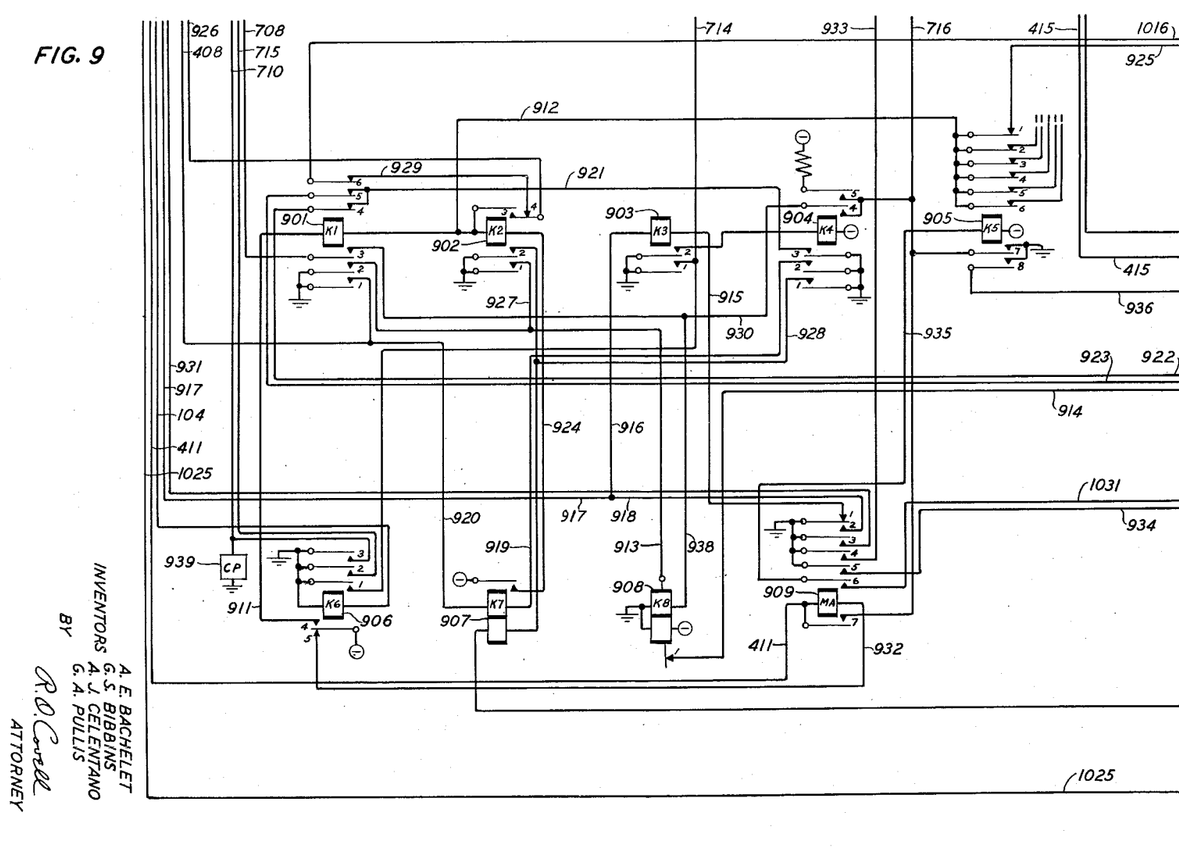

A plurality of control relays shown in Figs. 9 and 10 is provided to properly interlock and control the aforementioned crossbar switches. There is one group of control relays which is common to the entire system and there are lesser groups which are individual to the communication channels.

Figure 3:
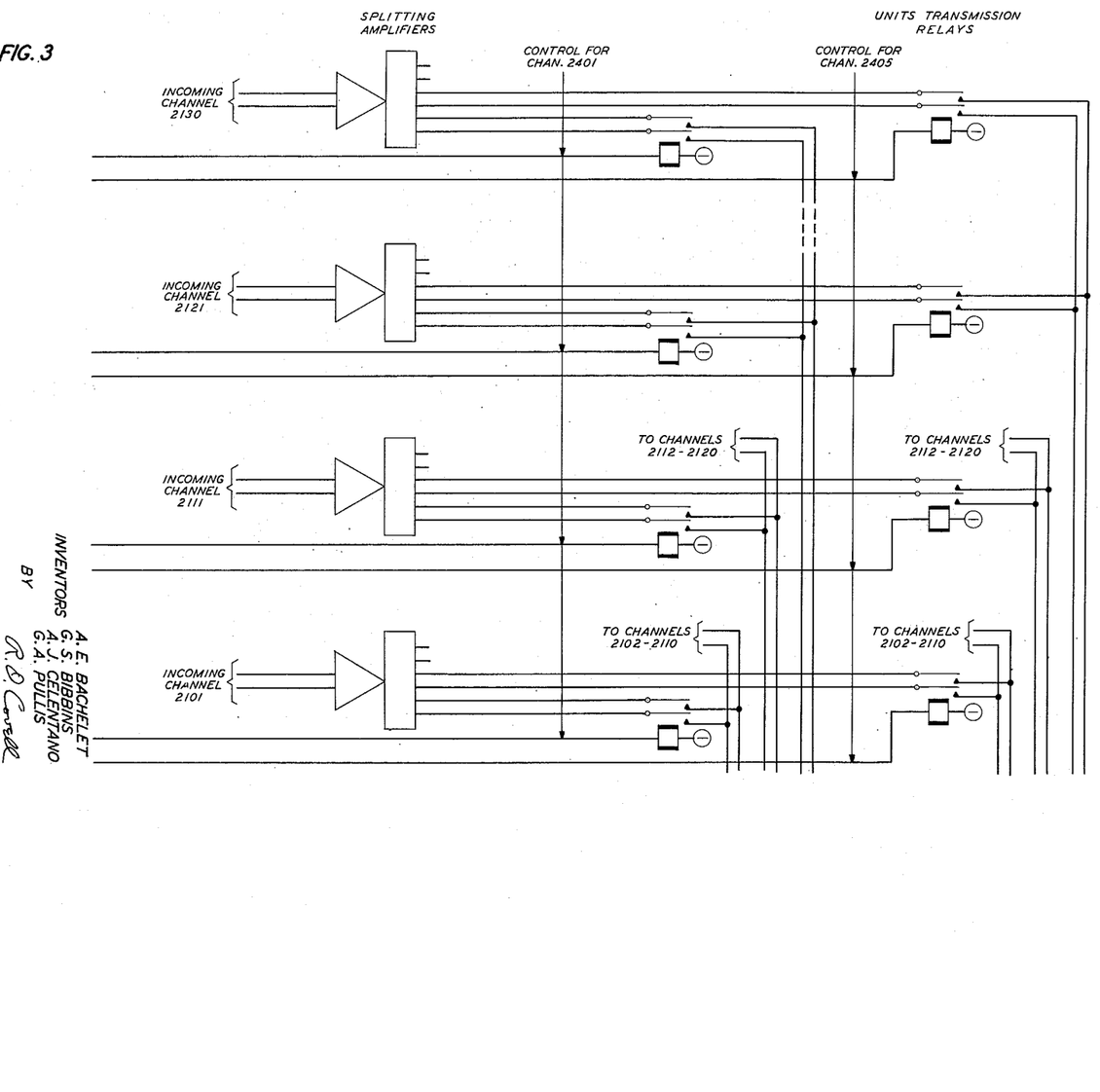
Figure 6:
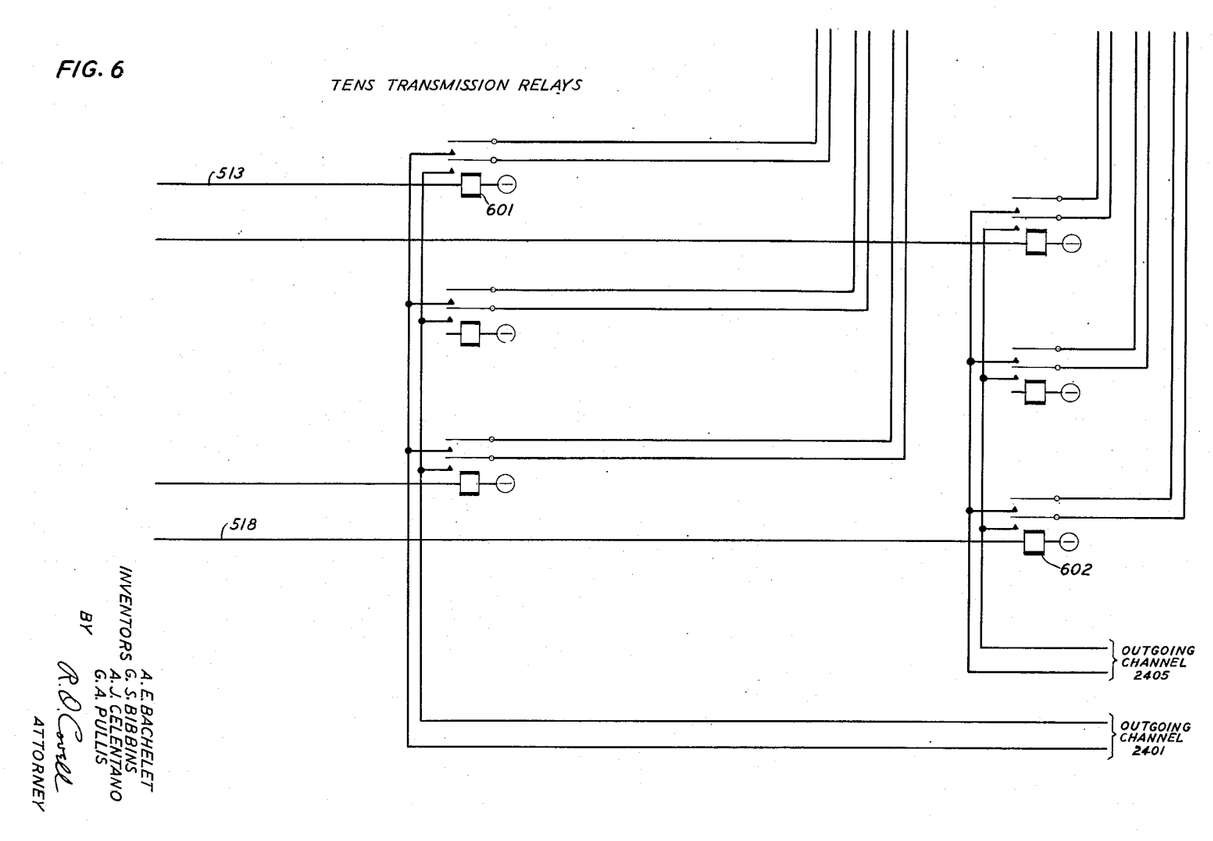

The actual transmission channel "switch" is accomplished by the operation of a tens relay shown in Fig. 6 and a units relay shown in Fig. 3 which are energized in accordance with the closed execute crosspoints of crossbar switch "A" 510 and crossbar switch "B" 209, respectively. There are three tens relays and 3 groups of ten units relays per outgoing communication channel.

*Preselection*

The following description applies to the preselection of a "switch" between incoming communication channel 2101 and outgoing channel 2401. The sequential operation of the circuit elements in this example is fully described below.

To preselect the above switch, which is to be executed at a later time, key 401 in the horizontal row, corresponding to the outgoing line to be switched, and key 101 in the vertical row corresponding to the incoming line to which the outgoing line is to be switched, are held operated simultaneously.

Closure of key 101 completes operating paths for relays 701, 706, and 906. Relays 701 and 706 in parallel operate from negative battery over conductors 105 and 106, respectively, and a common path comprising the closed contacts of key 101, conductor 104 and the winding of relay 906 to ground. Simultaneous operation of relays 701 and 706 provides an operating path for the crossbar switch select magnet 201. The select magnet operating path being from negative battery through the select magnet winding, conductor 206, contact 1 of relay 701, conductor 710 and contact 3 of relay 906 to ground; thereby a horizontal row of the "B" crossbar switch 209 is selected by the operation of the incoming line key 101.

Each crosspoint of the "B" crossbar switch 209 when closed represents either a preselected interconnection between an incoming and an outgoing line or an executed switch. Closure of a crosspoint is accomplished by having a horizontal row select magnet and a vertical row hold magnet operated at the same time. The crosspoint remains closed until release of the vertical row hold magnet.

Figure 7:
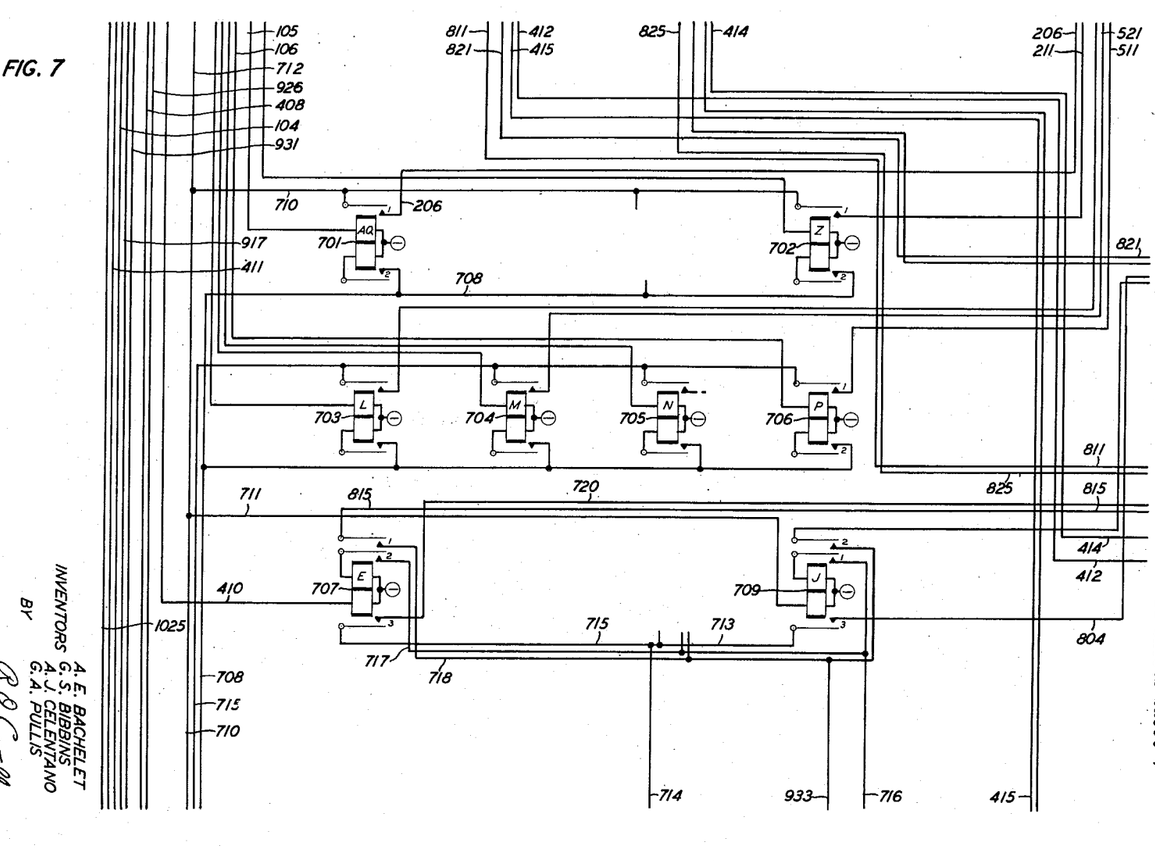

Relay 709 operates from a path which is completed by the operation of relay 906. The operating path is from ground, contact 3 of relay 906, conductors 710 and 711, and the winding of relay 709 to negative battery.

Closure of relay 709 completes the operating path for select magnet 803, which is assigned to the "individual execute" function. The select magnet operating path is from ground, contact 1 of relay 906, conductors 714 and 713, contact 3 of relay 709, conductor 804, and the winding of select magnet 803 to negative battery.

Simultaneous operation of relays 706 and 906 provides an operating path for the first tens steering circuit select magnet 503 which is assigned to incoming lines 2101 to 2110. The select magnet operating path is from negative battery through the winding of select magnet 503, conductor 511, contact 1 of relay 706, conductor 715, and contact 2 of relay 906 to ground.

In review of the foregoing description, tens steering select magnet 503 which is assigned to incoming lines 2101 to 2110, the units select magnet 201 which is assigned to lines 2101, 2111, and 2121 and the individual execute select magnet 803 are all operated.

Closure of the contacts of the units select magnet 201 provides an operating path for relay 901 from negative battery through contacts 4 of relay 906, conductor 911, winding of relay 901, conductor 912, contact 1 of relay 905, conductor 925, contact 2 of relay 1001, conductor 1006, contact 1 of select magnet 201, conductor 206, contact 1 of relay 701, conductor 710, and contact 3 of relay 906 to ground.

Closure of contact 1 of relay 901 completes an operating path for relay 1003, which is one of the group of control relays assigned to outgoing communication channel 2401. The operating path for relay 1003 is from negative battery through the winding of relay 1003, conductor 415, contact 1 of key 401, conductor 408 and contact 1 of relay 901 to ground.

Operation of relay 1003 will open the holding path for hold magnets 202 and 802, thereby restoring to the unoperated position any of the previously operated crosspoints which are associated with outgoing line 2401. The holding path is from ground through contact 3 of relay 1005, conductor 1008, contact 6 of relay 1003, conductor 1009 and the contact of hold magnet 802. The operation of relay 1003 opens its contact 6 and thereby releases the hold magnets.

Simultaneous operation of relays 901 and 1003 with hold magnet 202 unoperated provides an operating path for relay 1002, which in turn completes a path for energizing the hold magnets 202 and 802 which are associated with outgoing line 2401. The hold magnets when energized simultaneously with crossbar switch select magnets close the crossbar switch crosspoints defined by the operated select and hold magnets. In this example crosspoints 204, 506, and 805 close.

The operating path for relay 1002 is from ground, contact 2 of relay 901, conductor 913, contact 1 of relay 908, conductor 914, contact 3 of relay 1003, conductor 1010, contact 1 of hold magnet 202, conductor 210, and the winding of relay 1002 to negative battery.

Relay 908 is a polarized relay in an interlocking arrangement and its operation will be fully described under the heading "Double Connection Guard Circuit." Relay 908 is energized if more than one incoming line key is depressed simultaneously. Operation of relay 908 opens the foregoing operating path for relay 1002 or the operating path for the counterpart of relay 1002 in the control circuit of other outgoing lines. A preselection cannot be completed without the operation of relay 1002 in outgoing line 2401 or its counterpart in other outgoing line circuits.

Operation of relay 1002 applies ground to conductor 1011 through its contact 4 thereby energizing hold magnets 202 and 802 in parallel to negative battery.

Visual indication of the completion of the preselection is given to the operator by energizing lamp 102, which indicates a preselection between incoming line 2101 and outgoing line 2401, and lamp 409 which indicates that the preselection of outgoing channel 2401 has been made with provision for individual execution of the "switch."

Lamps 102 and 409 operate in parallel from negative battery to a common path which is from ground through contact 4 of relay 1004, conductor 1020, contact 6 of relay 1005, and conductor 1021, the remainder of the path for lamp 409 being contact 3 of crosspoint 805, conductor 821 and lamp 409 to negative battery; the remainder of the path for lamp 102 being contact 3 of crosspoint 506, conductor 517, contact 2 of crosspoint 204, conductor 214, and lamp 102 to negative battery.

The incoming and outgoing line selection keys may then be released, without regard for order of release, without disturbing the established preselection.

If upon completion of the preselection, key 101 is released while key 401 remains operated, the select magnets and control relays which are associated with the foregoing preselection will be deenergized.

Release of key 401 before the release of key 101 will alter this sequence only in regard to relays 1002 and 1003 which will, in this case, be the first relays to release.

Release of key 101 opens the connection between conductors 104 and 105 and thereby breaks the operating path for relay 906. Release of relay 906 removes ground from conductors 710, 714, and 715 thereby deenergizing relay 709, units select magnet 201, individual execute select magnet 803, and first tens steering select magnet 503. Release of relay 906 also removes negative battery from conductor 911 to deenergize relay 901. Release of relay 901 opens the holding paths for relays 701 and 706, and opens the previously described operating paths for relays 1002 and 1003. The holding path for relays 701 and 706 being from ground through the winding of relay 908, conductor 938, contact 3 of relay 901, conductor 708 and through parallel paths which include make contacts of relays 701 and 706, respectively.

Release of key 401 while key 101 is held operated will open the connection between conductors 415 and 408 and will thereby release relay 1003 which upon release opens the holding path for relay 1002. The holding path for relay 1002 is contact 1 of relay 1002, conductor 1010, contact 3 of relay 1003, conductor 914, contact 1 of relay 908, conductor 913 and contact 2 of relay 901 to ground.

*Salvo preselection*

The completed preselection may now be executed as an individual act or the preselection may be shifted to a salvo group in which several "switches" may be effected substantially simultaneously. The operator's choice of mode of execution will depend upon the switching program schedule.

The following describes the shifting of a completed preselection from the salvo group which is reserved for individual executions to a salvo group wherein several "switches" are simultaneously executed.

The shift from individual execute to salvo execute is made by having the key of a previously preselected outgoing line and a key of a salvo group simultaneously depressed. The preselection between incoming line 2101 and outgoing line 2401 may be shifted to salvo group 2501 by holding outgoing line key 401 and salvo group key 402 depressed simultaneously. This will effect operation of the control relays and the three select magnets which are associated with line 2101 and salvo group 2501. The select magnets are: (a) tens steering select magnet 503 for lines 2101 through 2110, (b) units select magnet 201, (c) salvo select magnet 801 for salvo group 2501. Upon completion of the operation of the select magnets, the previously operated hold magnets of outgoing line 2401 will release and, in turn, release the previously operated group of crosspoints 204, 506, and 805. Immediately thereafter the hold magnets 202 and 802 will reoperate to close the newly selected group of crosspoints 204, 506, and 812. Closure of these crosspoints will energize lamps 102 and 403 to indicate a preselection between incoming line 2101 and outgoing line 2401 arranged for execution by salvo group 2501.

The details of this operation are given in the following paragraphs.

Closure of salvo key 402 completes a path for the operation of relays 707 and 903, and these relays in turn, provide operating paths for salvo select magnet 801 and control relay 904.

The path for relays 707 and 903 is from ground through contact 1 of relay 909, the winding of relay 903, conductors 916 and 917, contact 1 of key 402, conductor 410, and the winding of relay 707 to negative battery. The operating path for select magnet 801 is from ground through contact 1 of relay 903, conductors 714 and 715, contact 3 of relay 707, conductor 720, and the winding of select magnet 801 to negative battery. The operating path for relay 904 is from ground through contact 2 of relay 903 and the winding of relay 904 to negative battery.

The closure of outgoing line key 401 and the operation of relay 904 completes a series operating path for relays 907 and 1003. Operation of relay 1003 completes operating paths for steering select magnet 503 and units select magnet 201. It should be noted that the tens steering select magnet and the units select magnet in this operation have operating paths which include the crosspoints which were closed by the previously described preselection.

The operating path for relays 907 and 1003 is from ground through contact 2 of relay 904, conductor 919, the winding of relay 907, conductors 920 and 408, contact 1 of key 401, conductor 415, and the winding of relay 1003 to negative battery.

The operating path for steering select magnet 503 is from ground through contact 3 of relay 904, conductor 921, contact 4 of relay 901, conductor 922, contact 2 of relay 1003, conductor 1014, contact 1 of crosspoint 506, conductor 512, and the winding of select magnet 503 to negative battery.

The operating path for select magnet 201 is from ground through contact 3 of relay 904, conductor 921, contact 5 of relay 901, conductors 923, contact 1 of relay 1003, conductor 1015, contact 1 of crosspoint 204, and the winding of select magnet 201 to negative battery.

Operation of relay 907 completes the operating path for relay 902. This path is from negative battery through the contact of relay 907, conductor 924, the winding of relay 902, conductor 912, contact 1 of relay 905, conductor 925, contact 2 of relay 1001, conductor 1006, contact 1 of select magnet 201, contact 1 of crosspoint 204, conductor 1015, contact 1 of relay 1003, conductor 923, contact 5 of relay 901, conductor 921, and contact 3 of relay 904 to ground.

Operation of relay 902 provides parallel holding paths for select magnets 201 and 503 and breaks the holding path for hold magnets 202 and 802. The holding paths for the select magnets are common from ground through contact 1 of annul key 416, conductor 926, contact 3 of relay 902, conductor 912, and contact 1 of relay 905 to conductor 925; the remainder of the holding path for select magnet 503 is conductor 1051, contact 1 of select magnet 503 and its winding to negative battery; the remainder of the holding path for select magnet 201 is contact 2 of relay 1001, conductor 1006, contact 1 of select magnet 201 and its winding to negative battery. Hold magnets 202 and 802 were held operated in parallel from negative battery through their windings, contact 1 of hold magnet 802, conductor 1009, contact 5 of relay 1003, conductor 1016, contact 6 of relay 901, contact 4 of relay 902, conductor 926, and contact 1 of annul key 416 to ground. It should be noted that release of hold magnets 202 and 802 releases crosspoints 204, 506 and 805 thereby extinguishing lamps 102 and 409.

Simultaneous operation of relays 902 and 1003 with hold magnet 202 deenergized provides an operating path for relay 1002, which in turn completes a path for energizing the hold magnets 802 and 202 which are associated with outgoing line 2401. The hold magnets, when energized simultaneously with crossbar switch select magnets 201, 503, and 801 will close crossbar switch crosspoints 204, 506, and 812.

The operating path for relay 1002 is from ground through contact 1 of relay 902, conductors 927 and 913, contact 1 of polarized relay 908, conductor 914, contact 3 of relay 1003, conductor 1010, contact 1 of hold magnet 202, conductor 210, and the winding of relay 1002 to negative battery.

As in the case of an individual preselection, if by error two or more salvo keys are depressed simultaneously, relay 908 will operate and open the path for relay 1002 and a salvo preselection cannot be completed. The detailed description of the operation of relay 908 is discussed under the heading, "Double Connection Guard Circuit."

Operation of relay 1002 applies ground to conductor 1011 thereby energizing hold magnets 202 and 802 in parallel to negative battery.

Visual indication of the salvo preselection is given to the operator by energizing lamp 102, which indicates a preselection between the incoming line 2101 and outgoing line 2401 and lamp 403 which indicates that the preselection of outgoing channel 2401 has been made with provision for salvo execution of the "switch." Lamps 102 and 403 operate in parallel from negative battery to a common path which is from ground through contact 4 of relay 1004, conductor 1020, contact 6 of relay 1005 and conductor 1021; the remainder of the path for lamp 403 being contact 3 of crosspoint 812, conductor 811 and lamp 403 to negative battery; the remainder of the path for lamp 102 being contact 3 of crosspoint 506, conductor 517, contact 2 of crosspoint 204, conductor 214 and lamp 102 to negative battery.

The outgoing line key 401 and the salvo key 402 may be released without regard for the order of release, without disturbing the salvo preselection. If the salvo key 402 is released prior to the release of outgoing line key 401 the control relays and the select magnets associated with the salvo preselection will all be deenergized without release of key 401. However, if key 401 is released while key 402 is held operated the order of release of the relays will be altered and a group of relays will remain energized until key 402 is released.

Release of key 402 removes negative battery from conductor 917 to deenergize relay 903 which upon opening removes ground from the winding of relay 904 and from conductor 714 to release salvo select magnet 801.

Release of relay 904 removes ground from conductor 919 to open the previously described operating paths for relays 907 and 1003. Release of relay 904 also breaks the holding path for relay 707. This holding path is from negative battery through the winding of relay 707, contact 2 of relay 707, conductors 717 and 716, contact 4 of relay 904, conductors 930 and 938 and the winding of relay 908 to ground.

As in the individual execute preselection, release of relay 1003 opens the holding path for relay 1002 by breaking the connection between conductors 914 and 1010.

Release of relay 907 removes negative battery from conductor 924 to deenergize relay 902 which upon release opens the holding path for select magnets 201 and 503. This holding path is from ground through contact 1 of the annul key 408, conductor 926, contact 3 of relay 902, conductor 912, contact 1 of relay 905, conductor 925 and contacts 1 and 2 of relay 1001 to negative battery through parallel paths which include the windings of select magnets 201 and 503.

*Individual execution*

The foregoing individual execute preselection may be executed by having the outgoing line key 401 and the master key 407 operated simultaneously. This will operate crossbar switch select and hold magnets to define and close crosspoints in the vertical "execute" row which is assigned to outgoing line 2401. These closed crosspoints will, as previously discussed, transmit information on two conductors to energize the proper tens relay and the units relay which when energized complete the transmission path between incoming line 2101 and outgoing line 2401.

Closure of master key 407 places ground on conductor 411 and thereby completes the operating path for relay 909. The remainder of said path is conductor 932 and contact 5 of relay 906 to negative battery.

Closure of outgoing line key 401, while relay 909 is operated provides an operating path for relay 1004. This operating path is from ground through contact 3 of relay 909, conductor 931, contact 2 of key 401, conductor 412, contact 2 of hold magnet 802, conductor 1017, and the winding of relay 1004 to negative battery.

Operation of relay 1004 effects the following results: (a) Opens the holding path for hold magnets 212 and 807 which are assigned to the execute function of outgoing line 2401. The holding path for hold magnets 212 and 2401 is from ground through contact 8 of relay 1004, conductor 1019, and through parallel paths which include the winding of hold magnets 212 and 807 to negative battery. The remainder of the path for hold magnet 807 is contact 1 and the winding of hold magnet 807, and the remainder of the path for hold magnet 212 is contact 2 of hold magnet 807, conductor 809 and the winding of hold magnet 212. (b) Opens the operating path for the tens relays and units transmission relays which were operated by a prior switch of outgoing line 2401. This thereby isolates outgoing line 2401 and prepares it for connection to an incoming line. The operating path for the tens transmission relays is from ground through contact 4 of relay 1004, conductor 1020, contact 6 of relay 1005, conductors 1021 and 810, contact 1 of the proper tens execute crosspoint and the winding of tens transmission relay to negative battery.

The winding of the units transmission path relays is in parallel with the tens relays and connects to conductor 810 through contact 2 of the proper tens execute crosspoint; the path for the units relay is completed through conductor 514, contact 1 of the proper units execute crosspoint and the winding of units transmission relay to negative battery. (c) Closes the operating paths for the tens steering select magnet 503 and the units select magnet 201. These select magnets operate in parallel to a comon path which is from ground to contact 3 of relay 909, conductor 931, contact 2 of key 401, conductor 412, contact 2 of hold magnet 802 and conductor 1017 which is the common point of connection; the parallel path for the tens select magnet 503 being from the aforementioned common point through contact 6 of relay 1004, conductor 1014, contact 1 of crosspoint 506, conductor 512, and the winding of select magnet 503 to negative battery; the parallel path for select magnet 201 starts with the connection of conductor 1017 to conductor 1015 through contact 5 of relay 1004 and then through contact 1 of crosspoint 204 and the winding of select magnet 201 to negative battery. (d) Completes the operating path for relay 1005 by grounding conductor 1018 through contact 3 of relay 1004. (e) Opens the operating path for preselect lamp 102 and individual execute lamp 409. The operating path for lamp 102 is from ground through contact 4 of relay 1004, conductor 1020, contact 6 of relay 1005, conductor 1021, contact 3 of crosspoint 506, conductor 517, contact 2 of crosspoint 204, conductor 214, and lamp 102 to negative battery. The operating path for lamp 409 is from ground through contact 4 of relay 1004, conductor 1020, contact 6 of relay 1005, conductor 1021, contact 3 of crosspoint 805, conductor 821 and lamp 409 to negative battery.

Operation of relay 1005 completes the operating path for hold magnets 212 and 807 which in conjunction with the operated select magnets 201 and 503 effect the closing of crosspoints 205 and 509. The operating path for hold magnet 807 is from ground through contact 2 of relay 1005, conductor 1022, and the winding of hold magnet 807 to negative battery. The operation of hold magnet 807 connects the grounded conductor 1022 to conductor 809 through contacts 1 and 2 of hold magnet 807 and thereby completes the operating path for hold magnet 212 to negative battery.

The master key 407 and the outgoing line key 401 may be released without regard for order of release, without affecting the foregoing completed "switch." The release of master key 407 will remove ground from conductor 411 and thereby release relay 909.

The contacts of outgoing line key 401 and relay 909 are both in the operating path of relay 1004 and select magnets 201 and 503; therefore, the release of either will deenergize relay 1004 and select magnets 201 and 503. The paths for select magnets 201 and 503 are broken by the opening of contact 3 of relay 909 or contact 2 of key 401. These operating paths were fully described above.

The release of relay 1004 will effect the following: (a) Opens the holding path for preselect hold magnets 202 and 802 by removing ground from conductor 1023. The hold path is from ground through contact 7 of relay 1004, conductor 1023, contact 6 of relay 1003, conductor 1009, contact 1 of hold magnet 802 and the windings of hold magnets 802 and 202 in parallel to negative battery. (b) Removes ground from conductor 1018 to deenergize slow release relay 1005.

The release of relay 1005 completes the operating path for the units relay 301 and the tends relay 601 in the transmission path of the communication channels and energizes the execute lamp 103. The units relay 301, the tens relay 601, and the execute lamp 103 operate in parallel from a common path which is from ground through contact 4 of relay 1004, conductor 1020, contact 6 of relay 1005, conductor 1021, conductor 810; the operating path for the tens relay being completed by contact 1 of crosspoint 509, conductor 513, and the winding of tens relay 601 to negative battery; the remainder of the path for units relay being contact 2 of crosspoint 509, conductor 514, contact 1 of crosspoint 205, conductor 213, and the winding of units relay 301 to negative battery; the operating path for lamp 103 is completed by connecting conductor 810 to conductor 515 through contact 3 of crosspoint 509 and then continuing via contact 6 of crosspoint 205, conductor 215 and lamp 103 to negative battery.

*Salvo execution*

In order to provide a complete description of a salvo execution, it is assumed that preselections have been made between incoming line 2130 and outgoing line 2405 and between incoming line 2101 and outgoing line 2401 with both preselections arranged for execution under salvo group 2501. Therefore, with these preselections completed the following circuit elements will be energized; (a) Associated with the preselection of incoming line 2101 and outgoing line 2401 are crosspoints 506, 204, and 812; hold magnets 202 and 802; and lamps 102 and 403. (b) Associated with the preselection of incoming line 2130 and outgoing line 2405 are crosspoints 216, 516, and 813; hold magnets 203 and 806; and lamps 106 and 412.

The foregoing preselections in salvo group 2501 may be executed by having salvo key 402 and the master key 407 depressed simultaneously.

At this time is should be noted that the outgoing lines may be arranged for immediate execution or, on an individual basis, these lines may be arranged to delay execution until the salvo key is released. Outgoing line 2401 is shown arranged for immediate execution and outgoing line 2405 is arranged for delayed execution. The difference between the control relay circuitry for these lines can be seen from an examination of relays 1005 and 1024. Relay 1024 has a holding path through its contact 1, conductor 1025, and contact 2 of salvo key 402 to ground. This holding path is absent in the case of outgoing line 2401; therefore, the release of relay 1005 is not dependent upon the release of salvo key 402.

Closure of the master key 407 places ground on conductor 411 to complete the operating path for relay 909. The remainder of this path is the winding of relay 909, conductor 932, and contact 5 of relay 906 to negative battery. Simultaneous operation of relay 909 and salvo key 402 provides an operating path for relay 707, said path being from ground through contact 2 of relay 909, conductors 918 and 917, contact 1 of key 402, conductor 410, and the winding of relay 707 to negative battery.

Operation of relay 707 provides an operating path for one control relay in each outgoing line which is arranged for execution under salvo group 2501. In this case relays 1002 and 1013 are energized by the operation of relay 707.

Relays 1002 and 1013 operate in parallel to a common path which is from ground through contact 4 of relay 909, conductors 933 and 718, contact 1 of relay 707, and conductor 815. The operating paths parallel each other from this point and the remainder of the path for relay 1002 is conductor 816, contact 2 of crosspoint 812, conductor 818, conductor 819, contact 5 of relay 1005, conductor 1029, and the winding of relay 1002 to negative battery. The operating path for relay 1013 continues from conductor 815 to conductor 817, contact 2 of crosspoint 813, conductors 814 and 1028, contact 5 of relay 1024, conductor 1027 and the winding of relay 1013 to negative battery.

Simultaneous operation of relays 909 and 1002 provide an operating path for relay 1001. This path is from ground through contact 5 of relay 909, conductor 934, contact 2 of relay 1002, conductor 1030, and the winding of relay 1001 to negative battery.

Closure of contact 4 of relay 1001 grounds conductor 1031 and this ground is carried through contact 6 of relay 909 and conductor 935 to energize a winding of relay 905.

The simultaneous operation of relays 905, 1001, and 1002 provides the operating path for relay 1004. Relay 1004 is assigned to outgoing line 2401 and when energized, its contact 1 opens the operating path for the relays which are the counterpart of relay 1004 in the remaining lines of the same group of five outgoing lines.

The path for relay 1004 is from ground through contact 8 of relay 905, conductor 936, contact 3 of relay 1001, conductor 1032, contact 5 of relay 1002, conductor 1017, and the winding of relay 1004 to negative battery.

As in the individual execution of a preselection, the operation of relay 1004 effects several results which are: (a) Opens the holding path for hold magnets 212 and 807 which are assigned to the execute function of outgoing line 2401. Said holding path is from ground through contact 8 of relay 1004, conductor 1019, and through parallel paths which include the windings of hold magnets 212 and 807 to negative battery. The remainder of the path for hold magnet 807 is contact 1 and the winding of hold magnet 807, and the remainder of the path for the hold magnet 212 is contact 2 of hold magnet 807, conductor 809, and the winding of hold magnet 212. (b) Opens the operating path for the tens and units transmission relays which were operated by a prior switch of outgoing line 2401. This thereby isolates outgoing line 2401 and prepares it for connection to an incoming line. The operating path for the tens transmission relays is from ground through contact 4 of relay 1004, conductor 1020, contact 6 of relay 1005, conductors 1021 and 810, contact 1 of the proper tens execute crosspoint and the winding of transmission relay to negative battery.

The winding of the units transmission path relays is in parallel with the tens relays and connects to conductor 810 through contact 2 of the proper tens execute crosspoint; the path to the units relay is completed through conductor 54, contact 1 of the proper units execute crosspoint and the winding of the units transmission relay to negative battery. (c) Closes the operating paths for the first tens steering select magnet 503 and the first units select magnet 201. These select magnets operate in parallel to a common path which is from ground through contact 3 of relay 909, conductor 931, contact 2 of key 401, conductor 412, contact 2 of hold magnet 802 and conductor 1017 which is the common point of connection for the parallel paths; the remainder of the operating path for the first tens select magnet 503 being from the common point conductor 1017, through contact 6 of relay 1004, conductor 1014, contact 1 of crosspoint 506, conductor 512 and the winding of the select magnet 503 to negative battery; the remainder of the operating path for select magnet 201 starts with the connection of conductor 1017 to conductor 1015 through contact 5 of relay 1004 and is then through contact 1 of crosspoint 204 and the winding of select magnet 201 to negative battery. (d) Completes the operating path for relay 1005 by grounding conductor 1018 through contact 3 of relay 1004. (e) Opens the operating path for preselect lamp 102 and salvo lamp 403. The operating path for lamp 102 is from ground to contact 4 of relay 1004, conductor 1020, contact 6 of relay 1005, conductor 1021, contact 3 of crosspoint 506, conductor 517, contact 2 of crosspoint 204, conductor 214 and lamp 102 to negative battery. The operating path for lamp 403 is from ground through contact 4 of relay 1004, conductor 1020, contact 6 of relay 1005, conductor 1021, contact 3 of crosspoint 812, conductor 811, and lamp 403 to negative battery.

Operation of relay 1005 completes the operating path for hold magnets 212 and 807 which in conjunction with the operated select magnets 201 and 503 effects the closing of crosspoints 205 and 509. The operating path for hold magnet 807 is from ground through contact 2 of relay 1005, conductor 1022, and the winding of hold magnet 807 to negative battery. The operation of hold magnet 807 connects the grounded conductor 1022 to conductor 809 through contacts 1 and 2 of hold magnet 807 and thereby completes the operating path for hold magnet 212 to negative battery.

Operation of hold magnet 212 destroys the holding path for relay 1002. Said holding path is from negative battery through the winding of relay 1002, conductor 1033, contact 1 of hold magnet 212, conductor 218, conductor 818, contact 2 of crosspoint 812, conductors 816 and 815, contact 1 of relay 707, conductor 718, conductor 933 and contact 4 of relay 909 to ground.

Release of relay 1002 opens the operating path for relay from ground through contact 8 of relay 905, conductor 936, contact 3 of relay 1001, conductor 1032, contact 5 of relay 1002, conductor 1017, and the winding of relay 1004 to negative battery.

Release of relay 1004 effects (a) The release of the tens steering select magnet 503 and the units select magnet 201 by opening contact 6 and contact 5 of relay 1004, respectively. (b) The release of crosspoints 204, 506, and 812 by releasing "A" switch hold magnet 802 and "B" switch hold magnet 202. The holding path for hold magnet 802 is from ground through contact 7 of relay 1004, conductor 1023, contact 6 of relay 1003, conductor 1009, contact 1 of hold magnet 802 and the winding of hold magnet 802 to negative battery; the winding of hold magnet 202 is connected in parallel with the winding of hold magnet 802 through conductor 1011. (c) The release of relay 1005 which completes parallel operating paths for the tens transmission relay 601, units transmission relay 301 and the associated execute lamp 103. These relays and the lamp operate to a common path which is from ground through contact 4 of relay 1004, conductor 1020, contact 6 of relay 1005; conductor 1021, and conductor 810 which is the common point of connection for the three parallel paths; the remainder of the path for tens relay 601 is contact 1 of crosspoint 509, conductor 513, and the winding of relay 601 to negative battery; the remainder of the path for units relay 301 is contact 2 of crosspoint 509, conductor 514, contact 1 of crosspoint 205, conductor 213, and the winding of relay 301 to negative battery; the remainder of the path for lamp 103 is contact 3 of crosspoint 509, conductor 515, contact 6 of crosspoint 205, conductor 215, and lamp 103 to negative battery.

Having completed the execution of the first preselection the control circuit shifts to execute the next preselection in the same group of five outgoing lines. The execution of the preselection between incoming line 2130 and outgoing line 2405 follows the same pattern as the described execution for the first preselection except that in the case of outgoing line 2405 execution is not completed until after salvo key 402 is released. This is the result of the previously described optional wiring of relay 1024.

As previously described relay 1013 operates in parallel with relay 1002. Release of relay 1004, which is in the control circuit for outgoing line 2401, completes the operating path for relay 1026. This path is from negative battery through contact 1 of relay 1004, conductor 1034, the winding of relay 1026, conductor 1035, contact 5 of relay 1013, conductor 1036, contact 6 of relay 1002, conductor 1032, contact 3 of relay 1001, conductor 936, and contact 8 of relay 905 to ground. Relay 1026 has the same function as relay 1004 and, therefore, effects several results which are as follows: (a) Opens the holding path for hold magnets 217 and 820 which are assigned to the execute function of outgoing line 2405. The holding path is from ground through contact 8 of relay 1026, conductor 1036 and through parallel paths which include the windings of hold magnets 217 and 820 to negative battery. The remainder of the path for hold magnet 820 is contact 1 and the winding of hold magnet 820 and the remainder of the path for hold magnet 217 is contact 2 of hold magnet 820, conductor 822, and the winding of hold magnet 217 to negative battery. (b) Opens the operating path for the tens and units transmission relays which were operated by a prior switch of outgoing line 2405. The operating path for the tens transmission relay is from ground through contact 4 of relay 1026, conductor 1037, contact 6 of relay 1024, conductor 1038, conductor 823, contact 1 of the proper tens execute crosspoint and the winding of tens transmission relay to negative battery.

The winding of the units transmission relays is in parallel with the tens relays and connects to conductor 823 through contact 2 of the proper tens execute crosspoint; the path to the units relay is completed through conductor 520, contact 3 of the proper units execute crosspoint and the winding of the units transmission relay to negative battery. (c) Closes the operating path for the tens steering select magnet 502 and units select magnet 21. These select magnets operate in parallel to a common path which is from ground through contact 8 of relay 905, conductor 936, contact 3 of relay 1001, conductor 1032, contact 6 of relay 1002, conductor 1036, contact 5 of relay 1013, conductor 1035 which is the common point of connection for the parallel paths; the remainder of the operating path for the third tens select magnet 502 being from a common point, conductor 1035 through contact 6 of relay 1026, conductor 1039, contact 1 of crosspoint 516, conductor 521 and the winding of select magnet 502 to negative battery; the remainder of the operating path for select magnet 211 starts with the connection of conductor 1035 to conductor 1040 through contact 5 of relay 1026 and is then through contact 1 of crosspoint 216, conductor 221 and the winding of the last units select magnet 211 to negative battery. (d) Completes the operating path for relay 1024 by grounding conductor 1041 through contact 3 of relay 1026. (e) Opens the operating path for preselect lamp 106 and salvo lamp 412. The operating path for lamp 106 is from ground through contact 4 of relay 1026, conductor 1037, contact 6 of relay 1024, conductors 1038 and 824, contact 3 of crosspoint 516, conductor 523, contact 4 of crosspoint 216, conductor 224 and preselect lamp 106 to negative battery.

The operating path for lamp 412 is from ground through contact 4 of relay 1026, conductor 1037, contact 6 of relay 1024, conductors 1038 and 824, contact 3 of crosspoint 813, conductor 825 and lamp 412 to negative battery.

Operation of relay 1024 completes the operating path for hold magnets 217 and 820 which in conjunction with the operated select magnets 211 and 502 effect the closing of crosspoints 220 and 519. The operating path for hold magnet 820 is from ground through contact 2 of relay 1024, conductor 1042, and the winding of hold magnet 820 to negative battery. The operation of hold magnet 820 connects the grounded conductor 1042 to conductor 822 through contacts 1 and 2 of hold magnet 820 and thereby completes the operating path for hold magnet 217 to negative battery. Operation of hold magnet 217 destroys the holding path for relay 1013. Said holding path is from negative battery through the winding of relay 1013, conductor 1043, contact 1 of hold magnet 217, conductors 225 and 814, contact 2 of crosspoint 813, conductors 817 and 815, contact 1 of relay 707, conductors 718 and 933, and contact 4 of relay 909 to ground. Release of relay 1013 opens the operating path for relay 1026 and the holding path for relay 1001. The operating path for relay 1026 is from ground through contact 8 of relay 905, conductor 936, contact 3 of relay 1001, conductor 1032, contact 6 of relay 1002, conductor 1036, contact 5 of relay 1013, conductor 1035, the winding of relay 1026, conductor 1034, and contact 1 of relay 1004 to negative battery.

The holding path for relay 1001 is from ground through contact 5 of relay 909, conductor 934, contact 2 of relay 1013, conductor 1030 and the winding of relay 1001 to negative battery. The opening of contact 4 of relay 1001 removes ground from conductor 1031 and thereby releases relay 905. The opening of contact 7 of relay 905 removes ground from conductor 716 and thereby destroys the parallel holding paths for relays 707 and 909.

Release of relay 1026 effects (a) the release of the tens steering select magnet 502 and units select magnet 211 by opening the previously described operating paths which included contacts 5 and 6 of relay 1026; (b) the release of crosspoints 216, 516, and 813 by releasing the "A" switch hold magnet 806 and the "B" switch hold magnet 203. Hold magnets 203 and 806 are held operated through parallel paths to negative battery from a common path which includes contact 1 of hold magnet 806, conductor 1050, contact 6 of relay 1012, conductor 1049, and contact 7 of relay 1026 to ground; and (c) destroys the previously described operated path for relay 1024 when contact 3 of relay 1026 is opened.

Relay 1024 is held operated under the control of salvo key 402. Upon release of the salvo key, relay 1024 will release and thereby complete the operating paths for the tens transmission relay 602 and the units transmission relay 302 along with the associated execute lamp 107. Relays 602 and 302 and lamp 107 operate in parallel to negative battery from a common path which is from ground through contact 4 of relay 1026, conductor 1037, contact 6 of relay 1024, conductors 1038 and 823; the remainder of the operating path for relay 602 is contact 1 of crosspoint 519, conductor 518 and the winding of relay 602; the remainder of the operating path for relay 302 is contact 2 of crosspoint 519, conductor 520, contact 3 of crosspoint 220, conductor 219 and the winding of relay 302; the remainder of the operating path for lamp 107 is contact 3 of crosspoint 519, conductor 522, contact 6 of crosspoint 220, conductor 222 and lamp 107.

Annulling a preselection

A preselection between an incoming line and an outgoing line may be annulled by having the annul key 416 and the key associated with the preselected outgoing line depressed simultaneously. For example, the preselection between incoming line 2101 and outgoing line 2401 may be annulled by having the annul key 416 and outgoing line key 401 depressed simultaneously. Thereby relay 1003 operates and opens the holding path for hold magnets 202 and 802, which upon release restore crosspoints 204, 506, and 812 to their unoperated condition.

The operating path for relay 1003 is from negative battery through the winding of relay 1003, conductor 415, contact 1 of outgoing line key 401, conductors 408 and 413 and contact 2 of annul key 416 to ground. Opening of contact 6 of relay 1003 destroys the holding path for hold magnets 202 and 802. The holding path is from ground through contact 3 of relay 1005, conductors 1008 and 1023, contact 6 of relay 1003, conductor 1009, and contact 1 of hold magnet 802 to parallel paths which include the windings of hold magnet 802 and hold magnet 202 to negative battery.

Restoration of crosspoints 204, 506, and 812 extinguishes preselect lamp 102 and salvo lamp 403.

These lamps operate in parallel from a common path which is from ground through contact 4 of relay 1004, conductor 1020, contact 6 of relay 1005, and conductor 1021; the remainder of the path for salvo lamp 403 being contact 3 of crosspoint 812, conductor 811, and lamp 403 to negative battery; and the remainder of the operating path for lamp 102 is contact 3 of crosspoint 506, conductor 517, contact 2 of crosspoint 204, conductor 214, and lamp 102 to negative battery.

Upon the release of annul key 416 relay 1003 is de-energized by breaking the previously described operating path for this relay.

Double connection guard

This switching system provides means for connecting an incoming line to one or more outgoing lines and means are provided to prevent accidental interconnection of two or more incoming lines or accidental interconnection of two or more salvo groups.

The operation of the guard circuit can be illustrated by assuming that key 101 for incoming line 2101 and key 110 for incoming line 2110 are accidentally depressed simultaneously. Although many circuit elements are energized by depressing keys 101 and 110, only the operation of those elements which is necessary to an understanding of the double connection guard circuit will be described at this time.

Simultaneous operation of keys 101 and 110 will cause the operation of relays 701, 702, and 706. These relays have parallel holding paths to a common path which includes the winding of relay 908. Relay 908 is electrically biased by current flowing in its primary winding and will remain unoperated until sufficient current flows in the secondary winding to overcome the biasing effect. The circuit constants have been chosen so that if two relays are held operated in parallel to the common path, which includes the winding of relay 908, the bias will not be overcome and relay 908 will remain unoperated; however, if three or more relays are held operated in parallel to this common path then relay 908 will operate and, as indicated under the individual preselection and the salvo preselection, will prevent completion of a preselection.

The common operating path for relays 701, 702, and 706 is from ground through the winding of relay 906, conductor 104 and key 101; the remainder of the operating path for relay 701 is conductor 105, and the winding of relay 701 to negative battery; the remainder of the operating path for relay 702 is contact 1 of key 110, conductor 112, and the winding of relay 702 to negative battery; the remainder of the operating path for relay 706 is conductor 106 and the winding of relay 706 to negative battery. These relays have parallel holding paths from negative battery through their own make contacts and conductor 708, contact 3 of relay 901, conductor 938 and the winding of relay 908 to ground.

Although the circuitry for only one salvo group is shown, the operation of the salvo double connection guard circuit can be illustrated by assuming that salvo key 402 and individual execute key 404 are held depressed simultaneously. This will effect the operation of relays 707, 709, 903 and 904. Relays 707 and 709 have holding paths which include the winding of relay 908 and the operation of relays 903 and 904 completes a circuit which causes an additional current equal to the hold current of either relay 707 or 709 to flow in the winding of relay 908. Therefore, the current in the winding of relay 908 is equal to the holding current of three relays and this is sufficient to overcome the biasing current in the primary winding and causes relay 908 to operate. As in the double connection guard circuit for prevention of preselection of two incoming lines, operation of relay 908 opens the operating circuit for relay 1002 and its counterpart in the other outgoing line control circuits. This prevents completion of a salvo preselection.

*Contact protection and reduction of radiated electrical energy*

It is common knowledge that electromechanical devices such as relays store energy in their magnetic cores and that large transient voltages are developed when the operating paths for such devices are opened. These transient voltages tend to cause arcing at the contacts which are opened to destroy the operating paths for such devices. Arcing contacts radiate noise energy over a rather wide frequency range. A portion of this energy lies within the frequency band transmitted by the communication channels of the subject invention. This invention economically suppresses radiated energy due to arcing contacts by using a minimum number of components. The circuitry is arranged to break many operating and holding paths through a common path in which a single protective network is provided rather than individual protective networks for each electromechanical device. This is illustrated by the common protective network 939 which suppresses radiated electrical energy which is developed by the release of "B" select magnets 201, 211, and the other intermediate units select magnets which are not shown. Select magnets 201 and 211 have a common path which is from ground through contact 3 of relay 906 and conductor 710, the remainder of the path for select magnet 201 being contact 1 of relay 701, conductor 206 and the winding of select magnet 201 to negative battery; the remainder of the path for select magnet 211 being contact 1 of relay 702, conductor 221, and the winding of select magnet 211 to negative battery. In each case relay 906 releases prior to the release of relays 701 or 702 and thereby protective network 939 will serve to discharge the stored energy. Alternative to this would be an arrangement wherein one protective network is supplied for each select magnet.

*Fuse failure holding circuit (Fig. 11)*

Figure 11:
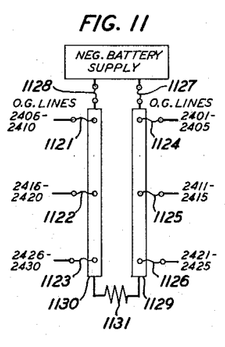
Fig. 11 is a schematic diagram of a battery supply bus bar arrangement in accordance with one aspect of the invention.
Figure 12:
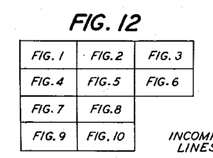

The negative battery for this system is supplied through relatively small fuses 1121 through 1126 which are each common to five outgoing lines. These fuses are supplied from bus bars 1129 and 1130 which are assigned to the odd and even groups of five outgoing lines, respectively, and are fused through 1127 and 1128, respectively. This arrangement is shown in Fig. 11. Continuity of service is of extreme importance in this type of operation; therefore, means are provided to hold preselections or interconnections in case of the failure of either fuse 1127 or 1128 but not in the case of failure of both 1127 and 1128. Bus bars 1129 and 1130 are at equal potential as long as fuses 1127 and 1128 have low impedance continuity; therefore, no current will flow through resistor 1131. However, if either fuse 1127 or 1128 were to become defective, current will flow through resistor 1131 to energize the bus bar with the defective fuse. The value of resistor 1131 is chosen to limit such current to a value which will allow previously operated preselections or interconnections to be held but will not necessarily permit the operation of additional preselections or interconnections.

What is claimed is:

1. A switching system comprising incoming and outgoing communication channels, first and second pluralities of sets of electrical contacts, said pluralities of sets each arranged in groups of sets individual to said outgoing communication channels, control means for selectively operating any particular set of said first plurality of sets of electrical contacts to register a preselection of an interconnection between any particular incoming and any particular outgoing communication channel, other control means including the operated contact set of said first plurality of sets of electrical contacts for selectively operating a corresponding set of said second plurality of said electrical contacts, and switching means controlled by said corresponding set of contacts of said second plurality of sets of electrical contacts to effect the preselected interconnection.

2. A switching system in accordance with claim 1 wherein said control means for operating any particular set of said first plurality of sets of electrical contacts includes a control relay having a contact set common to a plurality of paths for energizing a plurality of electromagnetic devices, a plurality of other control relays, each of said paths including at least one contact set of said other control relays and contact protection means connected to the contact set of said relay common to said plurality of paths, said control circuit arranged so that said relay having contacts common to said plurality of paths releases and thereby opens said paths prior to the release of said other control relays.

3. A switching system comprising incoming and outgoing communication channels, first and second pluralities of sets of electrical contacts, said pluralities of sets each arranged in groups individual to said outgoing communication channels, control means for selectively operating any particular set of said first plurality of sets of electrical contacts to register a preselection of an interconnection between any particular incoming and any particular outgoing communication channel, and means for releasing an operated set of said first plurality of sets of electrical contacts to annul a preselection of an interconnection of a particular incoming and a particular outgoing communication path.

4. A switching system comprising incoming and outgoing communication channels, a first plurality of sets of electrical contacts, control means for selectively operating any particular set of said first plurality of sets of electrical contacts to register a preselection of an interconnection between any particular incoming and any particular outgoing communication channel, means responsive to erroneous signals from said control means for preventing the interconnection of incoming communication channels, a second plurality of sets of electrical contacts, other control means including the operated contact set of said first plurality of sets for selectively operating a particular set of said second plurality of sets of electrical contacts, and switching means controlled by the operation of said set of contacts of said second plurality to effect the preselected interconnection.

5. A switching system comprising incoming and outgoing communication channels, first and second pluralities of sets of electrical contacts, said first and said second pluralities of sets each arranged in groups individual to said outgoing communication channels, a plurality of control means for selectively and individually operating particular sets of said electrical contacts of said first plurality to register a plurality of preselections between any particular incoming and any particular outgoing communication channels, other control means including the operated contact sets of said first plurality for selectively operating a plurality of particular sets of contacts of said second plurality, and switching means controlled by the operation of said operated sets of contacts of said second plurality to effect the preselected interconnections.

6. A switching system comprising incoming and outgoing communication channels, a plurality of sets of electrical contacts, said first and said second pluralities of sets each arranged in groups individual to said outgoing communication channels, a plurality of control means for selectively and individually operating particular sets of said electrical contacts to register a plurality of preselections between any particular incoming and any particular outgoing communication channel, other control means including the operated contact sets for selectively operating a plurality of second particular sets of said electrical contacts, and switching means controlled by the operation of said second sets of contacts to effect the preselected interconnections in a particular sequence.

7. In a switching system in accordance with claim 5, the combination comprising a source of electrical energy, a plurality of busses each providing energy to a different portion of said control means, a plurality of fusing elements connecting said busses to said source of energy, a resistive element interconnecting said busses to maintain any of said busses electrically energized in the event of failure of one but not all of said plurality of fuses.

8. A switching system comprising incoming and outgoing communication channels, crossbar switches having select and hold magnets for effecting the closing of any desired one of a coordinate array of first electrical contact sets, a plurality of second electrical contact sets, said first and second pluralities of electrical contact sets each being arranged in groups individual to said outgoing communication channels, control means for selectively operating any discrete combination of first and second electrical contact sets to register a preselection of an interconnection between any particular incoming and any particular outgoing communication channel, other control means including the operated combination of electrical contact sets for selectively operating a second discrete combination of first and second electrical contact sets, and switching means controlled by the operation of said second combination of contact sets to effect the preselected interconnection.

9. A switching system comprising incoming and outgoing communication channels, crossbar switches having select and hold magnets for effecting the closing of any desired one of a coordinate array of first electrical contact sets, a plurality of second electrical contact sets, said first and said second pluralities of electrical contact sets each being arranged in groups individual to said outgoing communication channels, control means for selectively operating any discrete combination of first and second electrical contact sets to register a preselection of an interconnection between any particular incoming and any particular outgoing communication channel, a second control means including the operated combination of electrical contact sets for selectively operating a second discrete combination of first and second electrical contact sets, switching means controlled by the operation of said second combination of contact sets to effect the preselected interconnection upon release of a portion of the second control means.

References Cited in the file of this patent

UNITED STATES PATENTS

| | | |
|---|---|---|
| 2,106,897 | Mercer | Feb. 1, 1938 |
| 2,129,011 | Lamberty | Sept. 6, 1938 |
| 2,258,854 | Kuchley | Oct. 14, 1941 |
| 2,261,370 | Hersey | Nov. 4, 1941 |
| 2,265,235 | Keyser | Dec. 9, 1941 |
| 2,355,908 | Dehn | Aug. 15, 1944 |
| 2,397,829 | Avery | Apr. 2, 1946 |
| 2,587,103 | Boyer | Feb. 26, 1952 |
| 2,690,548 | Joel | Sept. 28, 1954 |
| 2,732,435 | Krom et al. | Jan. 24, 1956 |